(12) United States Patent
Chowdhury et al.

(10) Patent No.: US 11,491,964 B2
(45) Date of Patent: Nov. 8, 2022

(54) VARIABLE MOTOR LAMINATIONS

(71) Applicant: MANDO CORPORATION, Gyeonggi-do (KR)

(72) Inventors: Mazharul Alan Chowdhury, Midland, MI (US); Md Sariful Islam, Raleigh, NC (US); Mohammad Islam, Saginaw, MI (US)

(73) Assignee: MANDO CORPORATION, Gyeonggi-Do (KR)

( * ) Notice: Subject to any disclaimer, the term of this patent is extended or adjusted under 35 U.S.C. 154(b) by 248 days.

(21) Appl. No.: 16/681,722

(22) Filed: Nov. 12, 2019

(65) Prior Publication Data
US 2020/0161953 A1    May 21, 2020

Related U.S. Application Data

(60) Provisional application No. 62/768,035, filed on Nov. 15, 2018.

(51) Int. Cl.
| *H02K 29/03* | (2006.01) |
| *H02K 1/14* | (2006.01) |
| *H02K 21/16* | (2006.01) |
| *H02K 1/27* | (2022.01) |
| *B60T 13/74* | (2006.01) |

(Continued)

(52) U.S. Cl.
CPC ........... *B60T 13/746* (2013.01); *B60T 1/065* (2013.01); *B60T 8/282* (2013.01); *B60T 13/741* (2013.01); *B62D 5/046* (2013.01); *B62D 5/0442* (2013.01); *B62D 15/021* (2013.01); *F16D 65/0979* (2013.01); *F16D 65/16* (2013.01); *G01B 7/315* (2013.01); *H02K 1/146* (2013.01); *H02K 1/2766* (2013.01); *H02K 21/16* (2013.01); *H02K 29/03* (2013.01); *F16D 55/14* (2013.01);
(Continued)

(58) Field of Classification Search
CPC ...... H02K 1/2766; H02K 1/146; H02K 21/16; H02K 2201/06; H02K 2213/03; H02K 29/03; B60T 13/741; B60T 13/746; B60T 1/065; B60T 8/282; B62D 15/021; B62D 5/0442; B62D 5/046; F16D 2121/24; F16D 2125/50; F16D 2127/06; F16D 55/14; F16D 65/0979; F16D 65/16; G01B 7/315
USPC ................................................... 310/156.07
See application file for complete search history.

(56) References Cited

U.S. PATENT DOCUMENTS

| 5,668,430 A | * | 9/1997 | Kolomeitsev | .......... | H02K 16/00 310/266 |
| 7,969,058 B2 | | 6/2011 | Rahman et al. | | |

(Continued)

FOREIGN PATENT DOCUMENTS

KR    10-1224722    1/2013

OTHER PUBLICATIONS

International Search Report for PCT/KR2019/015683 dated Mar. 19, 2020.

(Continued)

*Primary Examiner* — Alex W Mok
(74) *Attorney, Agent, or Firm* — Ladas & Parry, LLP (57) ABSTRACT

An electric motor with a rotor and a stator, where the rotor and/or the stator can comprise two or more sections, and a torque ripple caused by the magnetic field(s) associated with a section of the rotor (or stator) can at least partially counters torque ripple caused by the magnetic field(s) associated with other section(s) of the rotor (or stator).

13 Claims, 9 Drawing Sheets

(51) Int. Cl.
*B60T 1/06* (2006.01)
*B60T 8/28* (2006.01)
*B62D 5/04* (2006.01)
*B62D 15/02* (2006.01)
*F16D 65/097* (2006.01)
*F16D 65/16* (2006.01)
*G01B 7/315* (2006.01)
*H02K 1/276* (2022.01)
*F16D 55/14* (2006.01)
*F16D 121/24* (2012.01)
*F16D 125/50* (2012.01)
*F16D 127/06* (2012.01)

(52) U.S. Cl.
CPC ...... *F16D 2121/24* (2013.01); *F16D 2125/50* (2013.01); *F16D 2127/06* (2013.01)

(56) References Cited

U.S. PATENT DOCUMENTS

| | | | |
|---|---|---|---|
| 8,102,091 B2 | 1/2012 | Ionel | |
| 10,355,537 B2* | 7/2019 | Zhu | H02K 15/03 |
| 10,547,222 B2* | 1/2020 | Saito | B60L 15/20 |
| 10,797,546 B2* | 10/2020 | Lee | H02K 1/2766 |
| 2005/0285471 A1 | 12/2005 | Chen et al. | |
| 2008/0224558 A1* | 9/2008 | Ionel | H02K 1/2766 |
| | | | 310/156.57 |
| 2010/0026128 A1* | 2/2010 | Ionel | H02K 1/276 |
| | | | 310/156.53 |
| 2011/0031843 A1* | 2/2011 | Liang | H02K 1/27 |
| | | | 310/216.096 |
| 2012/0274160 A1 | 11/2012 | Hino et al. | |
| 2017/0229933 A1* | 8/2017 | Leonardi | H02K 1/16 |

OTHER PUBLICATIONS

Written Opinion of the International Searching Authority for PCT/KR2019/015683 dated Mar. 19, 2020.

* cited by examiner

VARIABLE MOTOR LAMINATIONS

CROSS-REFERENCE TO RELATED APPLICATIONS

This application claims the benefit of Provisional Application 62/768,035 filed on Nov. 15, 2018, the disclosure of which is incorporated by reference in its entirety.

TECHNICAL FIELD

This disclosure relates to electric motors and discusses methods of reducing ripple in motor torque and reducing cogging torque.

BACKGROUND

Electric motors operate by way of a rotor rotating in relation to a stator under the influence of magnetic interaction between components of the rotor and the stator. As the rotor rotates in relation to the stator, there can be variations in the interactive force/torque between the rotor and stator due to variations in the relevant magnetic fields. One effect on torque involved in the relative rotation can be referred to as "cogging torque." Cogging torque can be understood as a torque due to the interaction between magnets (e.g. permanent magnets) and slotting. In some embodiments, the magnets can be associated with the rotor while the slotting can be associated with the stator, and in some embodiments, the magnets can be associated with the stator while the slotting can be associated with the rotor. Sometimes cogging torque can be referred to as detent or "no-current" torque. Generally, cogging torque is undesirable and can be associated with jerkiness and torque ripple of the motor, especially at lower speeds. Accordingly, it can be desirable to reduce the cogging torque for the motor.

Another effect on torque involved in the relative rotation can be referred to as "torque ripple." Torque ripple can refer to a periodic increase or decrease in output torque the motor rotates.

SUMMARY

In a first aspect disclosed herein a motor rotor is provided, the motor rotor comprising: a rotor comprising first and second rotor sections and a series of magnets, the first rotor section comprising: a series of magnet pockets proximate an outer edge of the first rotor section and configured to receive respective magnets to magnetically interact with a series of coils located in a stator and distributed around the first rotor section to effect relative rotation of the rotor and stator upon energization of the coils during operation; each of the magnets having a respective d-axis extending through the magnet and the outer edge of the first rotor section; the first rotor section comprising for each magnet a respective air hole or air barrier that is symmetric about a respective d-axis; wherein each air hole or air barrier results in an asymmetric magnetic field for the respective magnet; the second rotor section comprising: a series of magnet pockets proximate an outer edge of the second rotor section and configured to receive respective magnets to magnetically interact with a series of coils located in a stator and distributed around the second rotor section to effect relative rotation of the rotor and stator upon energization of the coils during operation; each of the magnets having a respective d-axis extending through the magnet and the outer edge of the second rotor section; the second rotor section comprising for each magnet a respective air hole or air barrier that is asymmetric about a respective d-axis; wherein each air hole or air barrier results in an asymmetric magnetic field for the respective magnet; wherein the first rotor section is positioned in series with the second rotor section with the magnet pockets of the first rotor section corresponding to the magnet pockets of the second rotor section; and wherein each of the magnets is located within a magnet pocket of the first rotor section and a magnet pocket of the second rotor section; wherein during operation, the asymmetry of the magnetic fields of the second rotor section causes a ripple in the torque that at least partially counters a ripple of the asymmetry of the magnetic fields of the first rotor section.

In a second aspect disclosed herein, a motor stator is provided, the motor stator comprising: a first stator section and a second rotor section and a series of coils, the first stator section comprising: a series of winding openings, each winding opening configured to receive wire to form one of the series of coils wrapped around a tooth of the first stator section; each tooth of the first stator section providing a first stator magnetic field; the second stator section comprising: a series of winding openings, each winding opening configured to receive wire to form one of the series of coils wrapped around a tooth of the second stator section; each tooth of the second stator section providing a second stator magnetic field; wherein the first stator section is positioned in series with the second stator section with the teeth of the first stator section corresponding to the teeth of the second stator section and the coil for each tooth is made by winding conductor around a tooth of the first stator section and the corresponding tooth of the second stator section, and during operation, the first stator magnetic field causes a first ripple in the torque that at least partially counters a second ripple in the torque caused by the second stator magnetic field.

In a third aspect disclosed herein, a motor is provided, the motor comprising: a rotor comprising first and second rotor sections and a series of magnets; and a motor stator comprising first and second stator sections and a series of coils, wherein, the first rotor section comprising: a series of magnet pockets proximate an outer edge of the first rotor section and configured to receive respective magnets to magnetically interact with a series of coils located in a stator and distributed around the first rotor section to effect relative rotation of the rotor and stator upon energization of the coils during operation; each of the magnets having a respective d-axis extending through the magnet and the outer edge of the first rotor section; the first rotor section comprising for each magnet a respective air hole or air barrier that is asymmetric about a respective d-axis; wherein each air hole or air barrier results in an asymmetric magnetic field for the respective magnet; the second rotor section comprising: a series of magnet pockets proximate an outer edge of the second rotor section and configured to receive respective magnets to magnetically interact with a series of coils located in a stator and distributed around the second rotor section to effect relative rotation of the rotor and stator upon energization of the coils during operation; each of the magnets having a respective d-axis extending through the magnet and the outer edge of the second rotor section; the second rotor section comprising for each magnet a respective air hole or air barrier that is asymmetric about a respective d-axis; wherein each air hole or air barrier results in an asymmetric magnetic field for the respective magnet; wherein the first rotor section is positioned in series with the second rotor section with the magnet pockets of the first rotor section corresponding to the magnet pockets of the second rotor section; and wherein each of the magnets is located within a magnet pocket of the first rotor section and a magnet pocket of the second rotor section; the first stator section comprising: a series of winding openings, each winding opening configured to receive wire to form one of the series of coils wrapped around a tooth of the first stator section; each tooth of the first stator section providing a first stator magnetic field; the second stator section comprising: a series of winding openings, each winding opening configured to receive wire to form one of the series of coils wrapped around a tooth of the second stator section; each tooth of the second stator section providing a second stator magnetic field; wherein the first stator section is positioned in series with the second stator section with the teeth of the first stator section corresponding to the teeth of the second stator section and the coil for each tooth is made by winding conductor around a tooth of the first stator section and the corresponding tooth of the second stator section; and during operation, the first stator magnetic field causes a ripple in the torque that at least partially counters a ripple in the torque caused by the second stator magnetic field.

In a first embodiment of the second or third aspect, the tooth of the first stator comprises a first tooth head, and the first tooth head has a first tooth head shape, the tooth of the second stator section comprises a second tooth head, and the second tooth head has a second tooth head shape, the first and second tooth heads being different from one another, and a difference between the first and second torque ripples is related to a difference in the first and second tooth head shapes.

In a second embodiment of the second or third aspect, the tooth of the first stator comprises a first tooth head, and the first tooth head has a first tooth head shape, the tooth of the second stator section comprises a second tooth head, and the second tooth head has a second tooth head shape, the first and second tooth heads being different from one another, and a difference between the first and second torque ripples is related to a difference in the first and second tooth head shapes and the first tooth head shape and the second tooth head shape differ in an edge-to-edge width.

In a third embodiment of the second or third aspect, the tooth of the first stator comprises a first tooth head, and the first tooth head has a first tooth head shape, the tooth of the second stator section comprises a second tooth head, and the second tooth head has a second tooth head shape, the first and second tooth heads being different from one another, and a difference between the first and second torque ripples is related to a difference in the first and second tooth head shapes and the first tooth head has a face that comprises one or more facets and the second tooth had has a face that comprises one or more facets that correspond to the one or more facets of the first tooth head, and the first tooth head shape and the second tooth head shape differ in a surface area of a facet of the first tooth head and a corresponding facet of the second tooth head.

In a fourth embodiment of the third aspect, the asymmetry of the magnetic field in the first and second rotor sections is caused by asymmetry in air holes only.

In a fifth embodiment of the third aspect, the asymmetry of the magnetic field in the first and second rotor sections is caused by asymmetry in air barriers only.

In a first embodiment of the first aspect, the asymmetry of the magnetic field in the first and second rotor sections is caused by asymmetry in air holes only.

In a second embodiment of the first aspect, the asymmetry of the magnetic field in the first and second rotor sections is caused by asymmetry in air barriers only.

In a third embodiment of the first aspect the motor rotor further comprises a third rotor section, the third rotor section comprising: a series of magnet pockets proximate an outer edge of the third rotor section and configured to receive respective magnets to magnetically interact with a series of coils located in a stator and distributed around the third rotor section to effect relative rotation of the rotor and stator upon energization of the coils during operation; each of the magnets having a respective d-axis extending through the magnet and the outer edge of the first rotor section; wherein the third rotor section is aligned with the first and second rotor sections with the magnet pockets of the third rotor section corresponding to the magnet pockets of the first and second rotor sections; and wherein each of the magnets is located within a magnet pocket of the first, second and third rotor sections.

In a fourth embodiment of the first aspect, the motor rotor further comprises a third rotor section, the third rotor section comprising: a series of magnet pockets proximate an outer edge of the third rotor section and configured to receive respective magnets to magnetically interact with a series of coils located in a stator and distributed around the third rotor section to effect relative rotation of the rotor and stator upon energization of the coils during operation; each of the magnets having a respective d-axis extending through the magnet and the outer edge of the first rotor section; wherein the third rotor section is aligned with the first and second rotor sections with the magnet pockets of the third rotor section corresponding to the magnet pockets of the first and second rotor sections; and wherein each of the magnets is located within a magnet pocket of the first, second and third rotor sections and the third rotor section comprising for each magnet a respective air hole or air barrier that is asymmetric about a respective d-axis; wherein each air hole or air barrier results in an asymmetric magnetic field for the respective magnet, and during operation, the asymmetry of the magnetic fields of the third rotor section causes a ripple in the torque that at least partially counters a ripple of the asymmetry of the magnetic fields of the first rotor section and/or the second rotor section.

In a seventh embodiment of the third aspect the motor rotor further comprises a third rotor section, the third rotor section comprising: a series of magnet pockets proximate an outer edge of the third rotor section and configured to receive respective magnets to magnetically interact with a series of coils located in a stator and distributed around the third rotor section to effect relative rotation of the rotor and stator upon energization of the coils during operation; each of the magnets having a respective d-axis extending through the magnet and the outer edge of the first rotor section; wherein the third rotor section is aligned with the first and second rotor sections with the magnet pockets of the third rotor section corresponding to the magnet pockets of the first and second rotor sections; and wherein each of the magnets is located within a magnet pocket of the first, second and third rotor sections.

In an eighth embodiment of the third aspect the motor rotor further comprises a third rotor section, the third rotor section comprising: a series of magnet pockets proximate an outer edge of the third rotor section and configured to receive respective magnets to magnetically interact with a series of coils located in a stator and distributed around the third rotor section to effect relative rotation of the rotor and stator upon energization of the coils during operation; each of the magnets having a respective d-axis extending through the magnet and the outer edge of the first rotor section; wherein the third rotor section is aligned with the first and second rotor sections with the magnet pockets of the third rotor section corresponding to the magnet pockets of the first and second rotor sections; and wherein each of the magnets is located within a magnet pocket of the first, second and third rotor sections and the third rotor section comprising for each magnet a respective air hole or air barrier that is asymmetric about a respective d-axis; wherein each air hole or air barrier results in an asymmetric magnetic field for the respective magnet, and during operation, the asymmetry of the magnetic fields of the third rotor section causes a ripple in the torque that at least partially counters a ripple of the asymmetry of the magnetic fields of the first rotor section and/or the second rotor section.

In a fourth aspect, an electric motor is provided, the electric motor has a rotor and a stator, where the rotor and/or the stator can comprise two or more sections, and a torque ripple caused by the magnetic field(s) associated with a section of the rotor (or stator) can at least partially counters torque ripple caused by the magnetic field(s) associated with other section(s) of the rotor (or stator).

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Rotating electric motors, including permanent magnet motors, can operate by a magnetic interaction between a rotor located within a stator. The description provided herein will be based upon interior permanent magnet motors, but the teachings provided can also be directed embodiments that are surface permanent magnet motors. In addition, the descriptions provided herein will be based upon the magnets being located on or within a rotor which is surrounded by a stator that can include coils and can include slotting, but the teachings provided can also be directed to embodiments where the magnets are located on or within the stator and the rotor includes coils and/or slotting.

Figure 1:
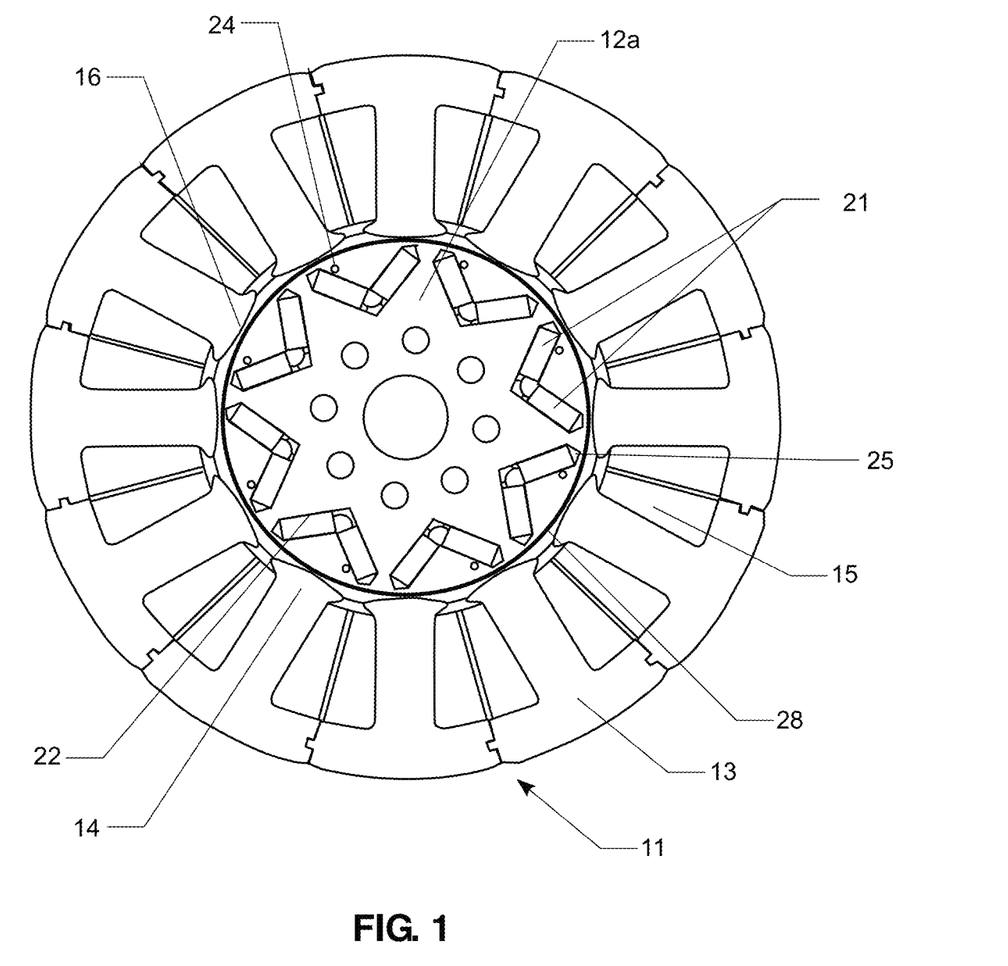
FIG. 1 is a diagram of an embodiment of a rotor and stator of a motor.

As shown in FIG. 1, an electric motor 11 can include a rotor 12 surrounded by a stator 13. The rotor can include a series of magnets 21 arranged proximate the outer edge 28 of the rotor. The magnets can be located in pockets 22, and can have any suitable shape. In FIG. 1, each magnet is "V"-shaped. In additional embodiments, the magnets can be bar-type or rectangular-shaped or "U"-shaped as well as combinations among these and combinations with "V"-shaped magnets. Each magnet can also be a single-piece or multiple pieces, with the magnets of FIG. 1 being two pieces with the polarity of each piece directed in the same direction. In many embodiments of electric motors, the series of magnets can have alternating polarities where the polarity of one magnet is directed in a first direction and the polarity of the next magnet progressing around the rotor is directed in the opposite direction.

Magnets 21 can be located in pockets 22. Magnet pockets 22 can be shaped Magnets 21 can be located in pockets 22. Magnet pockets 22 can be shaped to include one or more air barriers 25, which provide an air gap between the magnet 21 located within a pocket 22 and an interior wall of the pocket 22, such as at an end of the magnet 21 or along a face of the magnet 21. In some embodiments, multiple air barriers 25 can be present within a pocket 22. In FIG. 1, the pockets 22 have three air barriers 25, with one at each opposite end of the first and second parts of each magnet 21 and one pocket 22 between the adjacent ends of the first and second parts of each magnet 21.

The rotor can be of any suitable design. The rotor 12 shown in FIG. 1 is shown with a stator 13 that includes a series of teeth 14 directed inward with slots and winding openings 15 located between adjacent teeth 14 and configured for winding a coil around each tooth.

The motor is operated by sequentially energizing the coils which then creates an electromagnetic field that interacts with the magnets of the rotor to apply a torque to the rotor and causes the rotor to turn in relation to the stator. As the motor rotates, the teeth (and respective coils) magnetically interact with nearby magnets, and this interaction can, in some embodiments, vary, resulting in a ripple in the torque supplied by the motor. In some embodiments, increasing the number of teeth and magnets can reduce the magnitude of the ripple. However, other methods of reducing the ripple can also be desirable.

Figure 2:
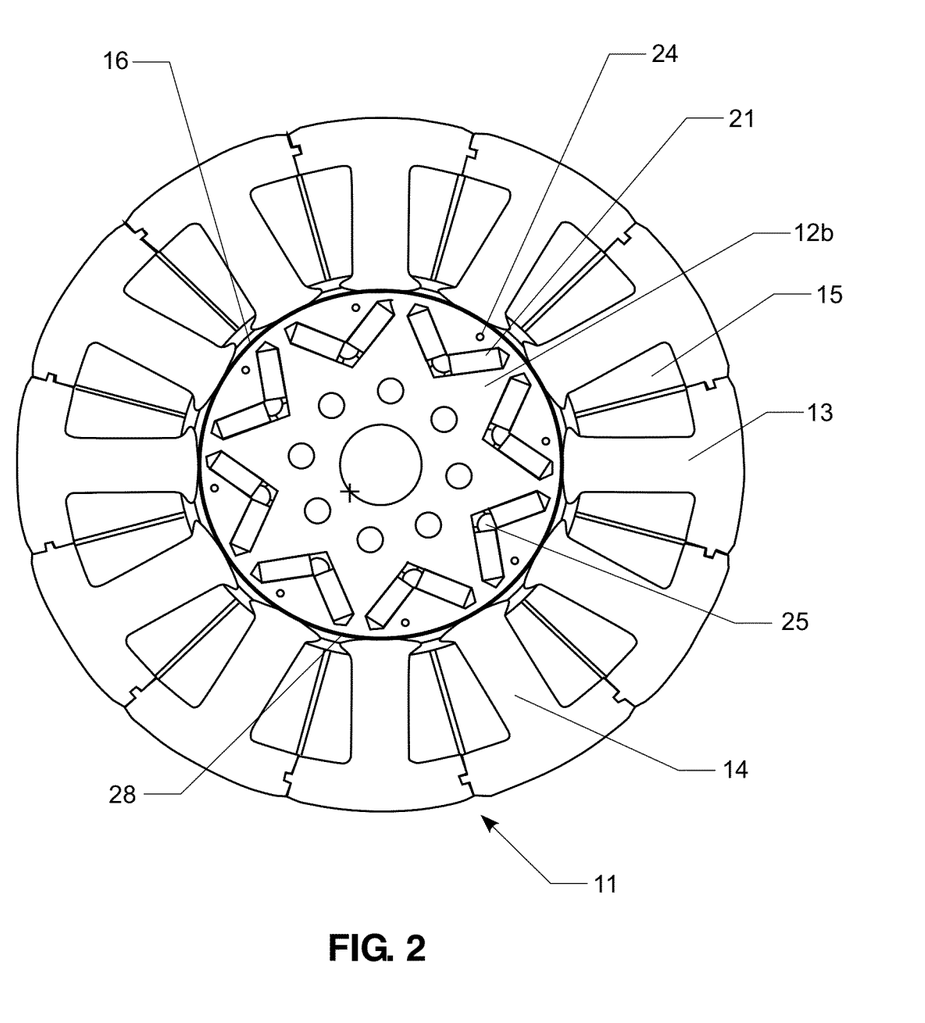
FIG. 2 is a diagram of an embodiment of a rotor and stator of a motor.
Figure 3:
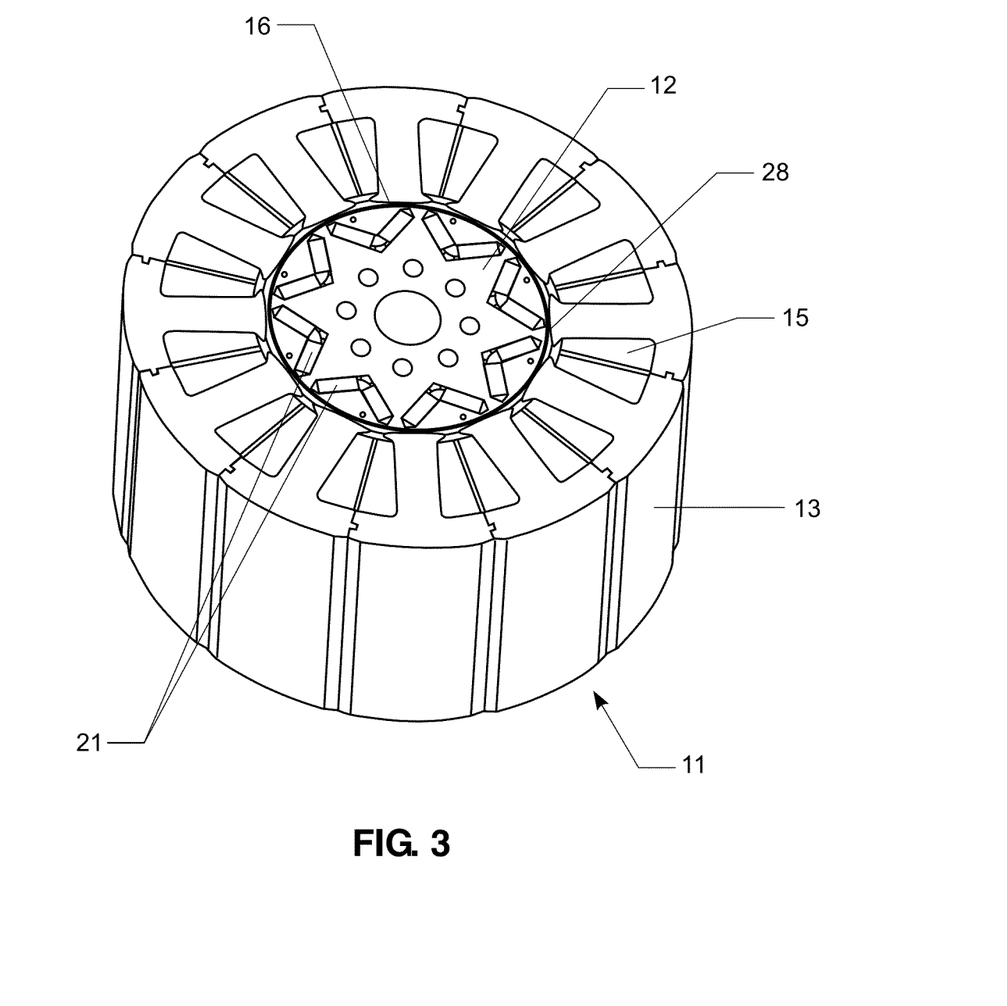
FIG. 3 is a diagram of an embodiment of a rotor and stator of a motor.
Figure 4:
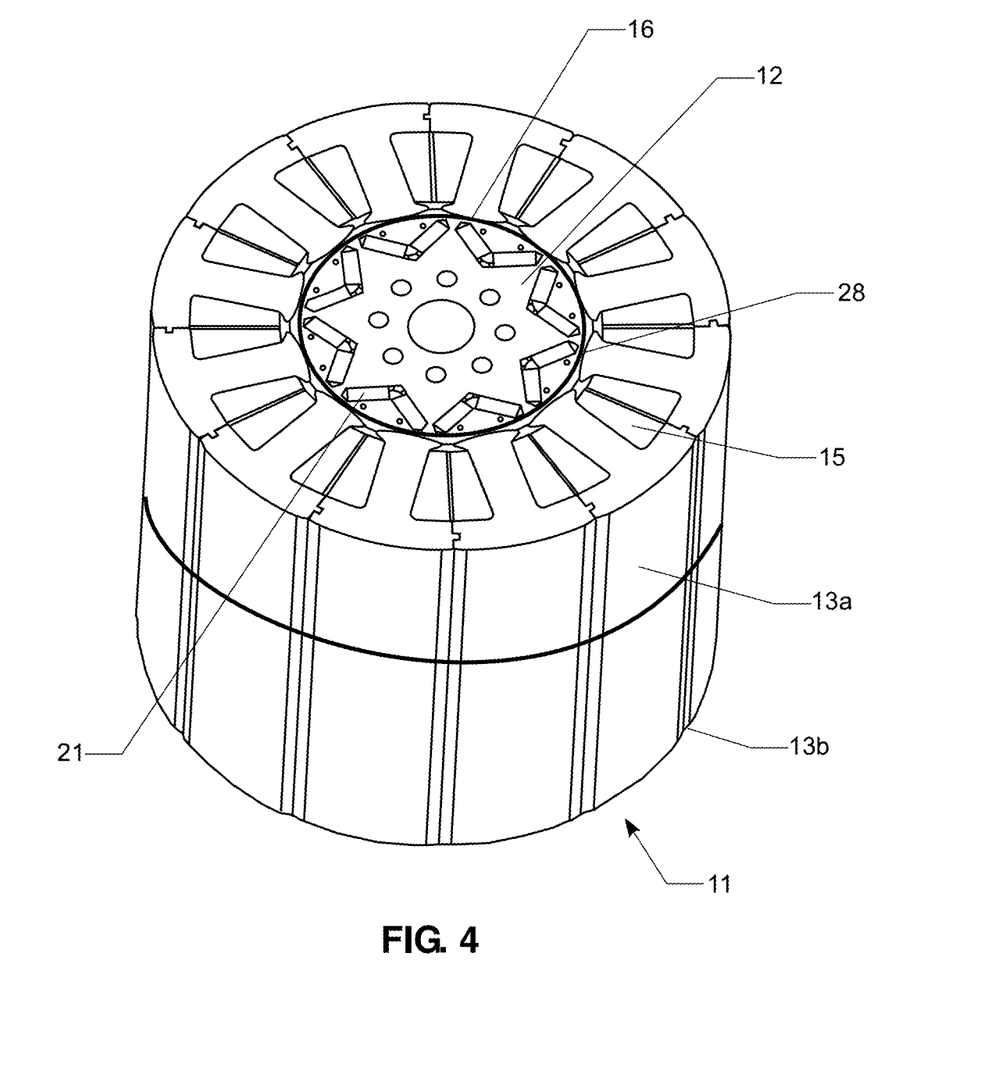
FIG. 4 is a diagram of an embodiment of a stator with variable lamination.
Figure 5:
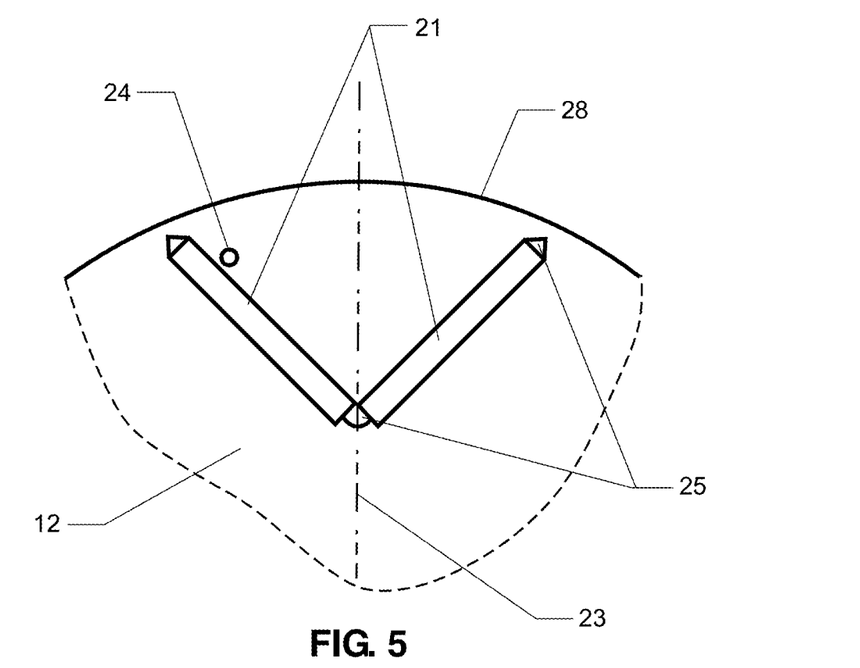
FIG. 5 is a diagram of an embodiment of a magnet in a rotor.
Figure 6:
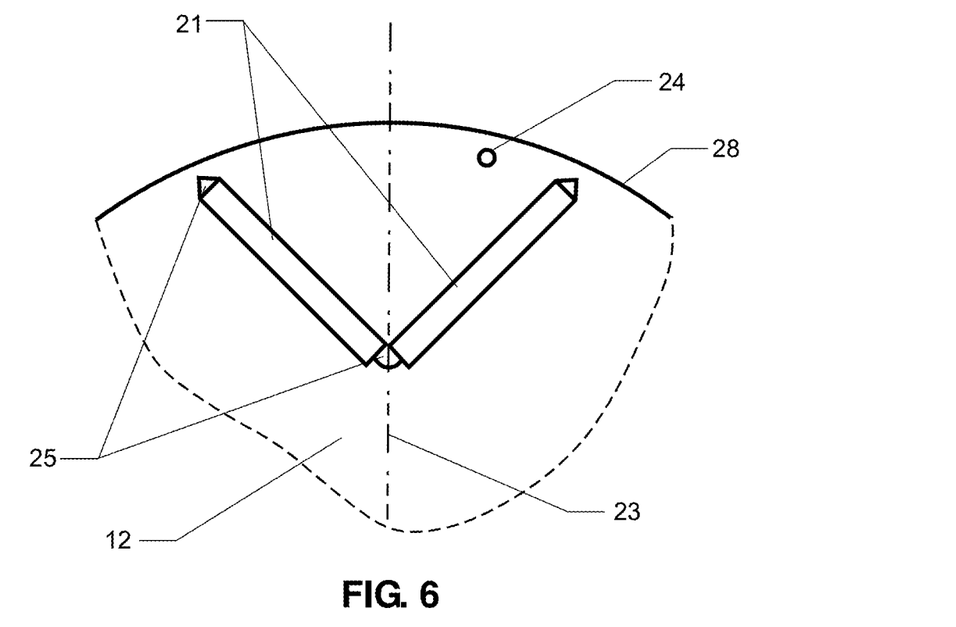
FIG. 6 is a diagram of an embodiment of a magnet in a rotor.
Figure 9:
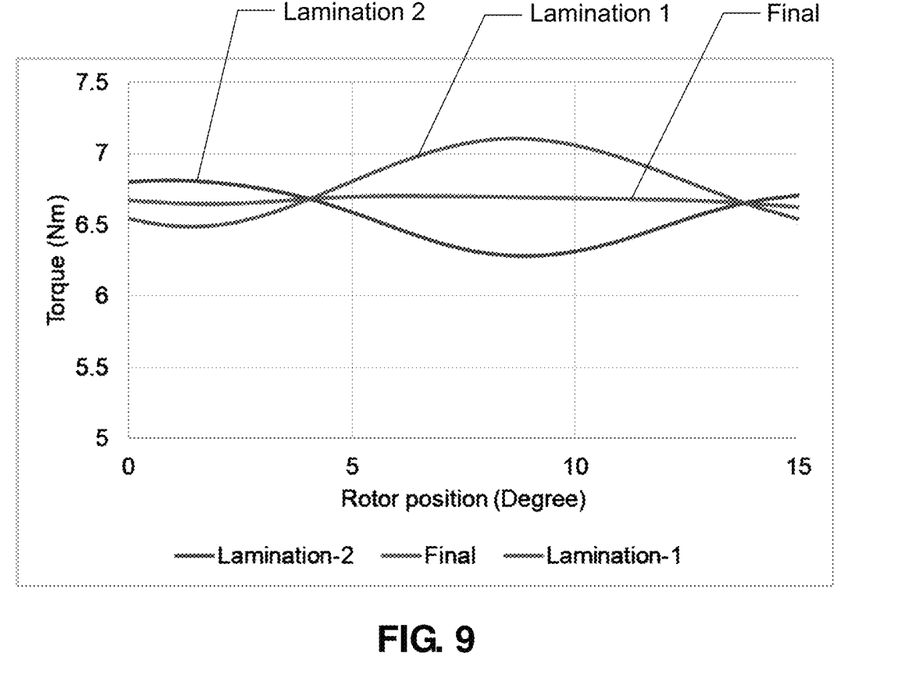
FIG. 9 is a diagram of modeled torque ripple vs. rotor position for an embodiment of rotors in a motor.
Figure 10:
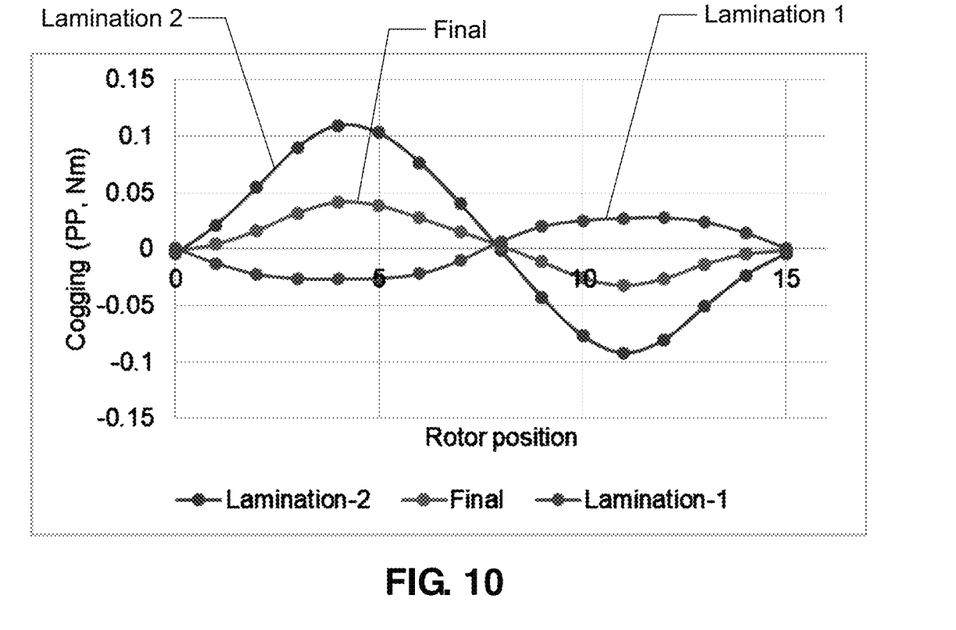
FIG. 10 is a diagram of modeled cogging torque vs. rotor position for an embodiment of rotors in a motor.

In one approach to reduce torque ripple, an asymmetry can be provided in a first section of the rotor 12a, such as by providing an air hole 24 in a first section of the rotor 12a at each of the magnets 21, such as that shown in FIGS. 1 and 5, that is asymmetric in relation to the d-axis 23 of the magnet extending through the magnet and the outer edge of the rotor holes, to provide an unequal effect on the magnetic field on either side of the d-axis 23. In the embodiment of FIGS. 1 and 5, the air hole 24 is located to the left of the d-axis 23. Note that air hole 24 is asymmetric with regard to the d-axis 23 in FIGS. 1 and 5 in that the air hole 24 is only located on one side of the d-axis 23. In additional embodiments, asymmetry regarding an air hole 24 or a series of air holes 24 in relation to each magnet can be achieved by locating an air hole 24 or a series of air holes to provide an unequal effect on the magnetic field on either side of the d-axis 23, such as by locating the air hole 24 or series of air holes 24 in an unequal manner on either side of the d-axis 23. In FIGS. 1 and 5, a single air hole is shown on only one side of the d-axis 23. The first rotor section 12a can then be paired with a second rotor section 12b, such as that shown in FIGS. 2 and 6. In FIGS. 2 and 6, a countering asymmetry to the magnetic field generated by the magnet 24 of the first rotor section 12a is produced by placing an air hole 24 on the right side of the d-axis 23 of the magnet 24 in FIGS. 2 and 6. The size and placement of the air hole 24 in the first rotor section 12a and the size and placement of the air hole 24 in the second rotor section can be selected such that the asymmetry or distortion of the magnetic fields generated by the magnets in the first and second rotor sections counter one another to reduce torque ripple as shown in FIG. 9 and cogging torque as shown in FIG. 10.

In some embodiments of a laminated rotor 12 described herein, a first rotor section 12a can be positioned in series with a second rotor section 12b, where the two rotor sections are placed end-to-end such that the center line of the rotor sections are co-axial and the pockets 22 of the first rotor section 12a correspond with the pockets 22 of the second rotor section 12b, allowing each magnet to extend into a pocket 22 of the first rotor section 12a and a pocket 22 of the second rotor section 12b. In some embodiments, the first rotor section can be assembled to the second rotor section, and then the magnets can be slipped into the motor pockets from one end, to extend into the pockets of the first and second rotor layers.

In some embodiments, a third rotor layer can also be present, such as a rotor layer lacking the asymmetry of the first and second layers, or a rotor layer having asymmetry, such as that described for the first and second layers. In various embodiments, the third rotor layer can be positioned between the first and second rotor layers or can be positioned at one end or the other of the first and second rotor layer assembly.

In another embodiment of an asymmetric rotor section, an asymmetric air barrier 25 can be provided in a rotor section to provide an asymmetric magnetic field which can be countered at least partially by an asymmetric magnetic field in a second rotor section. In one such embodiment, an air barrier 25 can be added or an existing air barrier 25 can be modified to provide asymmetric air barriers 25 for each magnet, such as where the size of an air barrier to one side of the d-axis is larger than a corresponding air barrier on the other side of the d-axis or where the air barrier on one side of the d-axis is positioned to have a different effect on the magnetic field than the air barrier on the other side of the d-axis.

In some embodiments, a combination of asymmetric air holes 24 and air barriers 25 can be used, such as both asymmetric air holes 24 and asymmetric air barriers 25 are located within a rotor layer or where asymmetric air holes 24 are present in one rotor layer and asymmetric air barriers are present in a second rotor layer, where the first and second rotor layers are combined into a rotor for a motor.

In various embodiments of asymmetric rotor layers, the sizes and positions of the air holes 24 and/or air barriers 25 can be selected to provide a beneficial reduction in torque ripple and/or cogging torque.

In some embodiments, the asymmetric first and second rotor layers (and optional third rotor layer) can be used with a stator not having the asymmetric features described herein.

In a second approach to reduce torque ripple, different tooth designs can be used in a first stator section as compared to a second stator section. In some embodiments of different tooth designs between first and second stator sections, the teeth in the first and second stator sections can have the portion of the tooth where that is wound by wires (tooth body) be the same width between the first and second stator sections and the stator sections can be arrange for the tooth bodies of the first section to be aligned with the tooth sections of second stator section, such as to facilitate wrapping of the respective aligned teeth of the first stator section and the second stator section together. In various embodiments, the tooth head 30 (extending from the tooth body 29 toward the rotor in an assembled motor) can have a different design between the first and second rotor sections, such that the magnetic field from the first stator section is different from the magnetic field from the second stator section to advantageously reduce or substantially eliminate or eliminate torque ripple in the motor. In some embodiments of embodiment of different tooth designs, the mass of the tooth head can be varied between the first and second stator sections or an edge-to-edge width of the tooth head 30 can be varied between the first and second stator sections or a curvature of the tooth face can be varied between the first and second stator sections, or the shape of tooth faces can be varied between the first and second stator such that or the tooth faces can be faceted (with flat or curved facets) with one or more or all facets of the tooth face having a different surface area between corresponding facets of the first and second stator sections, or a shape of the tooth head resulting in a different volume of air present between the tooth and rotor of the first stator section as compared to the second stator section. In various embodiments of tooth designs, such as those discussed herein, the tooth designs can be symmetric or asymmetric about a tooth axis 27.

Figure 11:
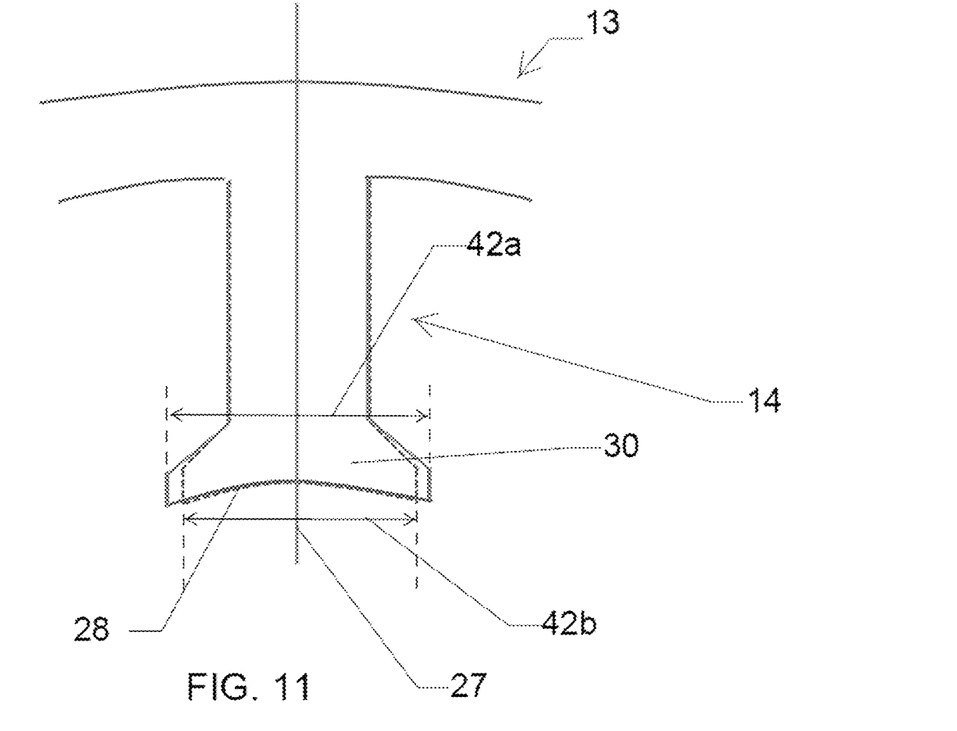
FIG. 11 shows an embodiment of stator teeth having different edge-to-edge width.

FIG. 11 shows an embodiment of stator teeth having different edge-to-edge width of the tooth head, such as where a first tooth, which can be associated with one of the first and second stator sections is shown in broken lines and a second tooth, which can be associated with the other of the first and second stator sections, is shown in solid lines, and the first tooth has a narrower edge-to-edge dimension 42b of the tooth head than the tooth head edge-to-edge dimension of the second tooth 42a. While FIG. 11 shows a symmetric edge-to-edge width variation, an asymmetric edge-to-edge variation, such as where the width to one side of the central axis is different from the width to the other side of the tooth axis 27. In various embodiments, the asymmetry can be reversed between the first and second stator sections.

Figure 12A:
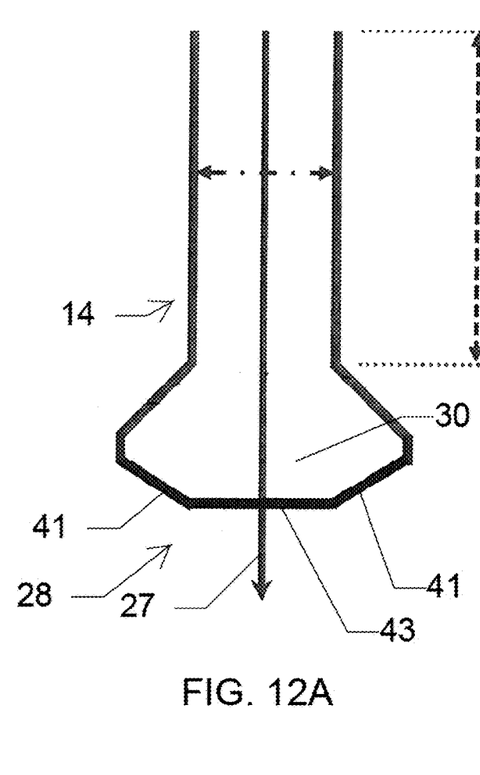
FIGS. 12A and 12B shows an embodiment of stator teeth with faceted tooth face.
Figure 12B:
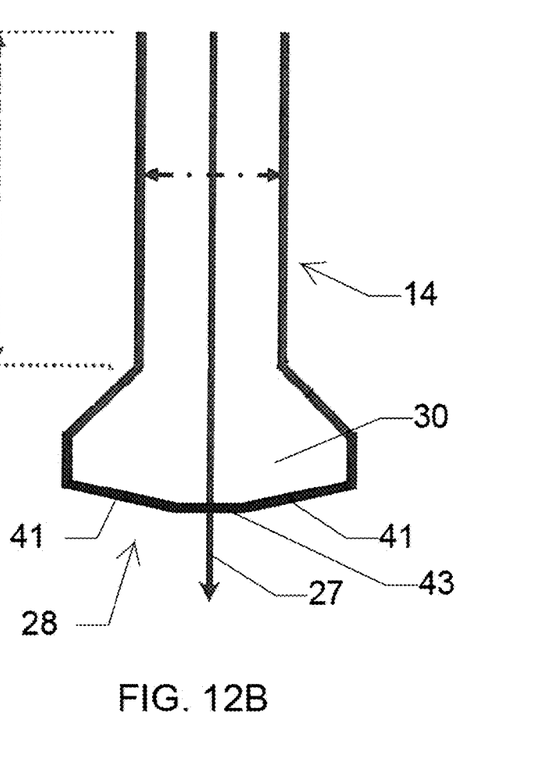

FIGS. 12A and 12B show different faceting of the tooth face where the surface area of the central facet 43 (facet intersecting the tooth axis 27) in FIG. 12A is larger than the central facet in FIG. 12B. In addition, facets to the side of the central facet 43 have less surface area than the corresponding facets in FIG. 12B and are positioned at a steeper angle to the central facet (and the tooth axis 27) than in FIG. 12B. FIGS. 12A and 12B show a symmetrical variation in the facet surface area, but an asymmetric variation in the facet surface area can be present also, such as where a facet area to one side of the tooth axis is different from a corresponding facet area on the opposite side of the tooth axis 27. In various embodiments, the asymmetry can be reversed between the first and second stator sections.

In some embodiments of an assymetric tooth design, an asymmetry can be provided in one or more or all teeth of a first stator section, such as by shaping the tooth faces 28 such that each tooth face 28 is asymmetric about a tooth axis 27 which bisects the tooth 14 at the tooth body 29, to provide an unequal effect on the magnetic field on either side of the tooth axis 27. FIG. 11 shows an embodiment of stator teeth having different edge-to-edge width of the tooth head, such as where a first tooth, which can be associated with one of the first and second stator sections is shown in broken lines and a second tooth, which can be associated with the other of the first and second stator sections, is shown in solid lines, and the first tooth has a narrower edge-to-edge dimension 42b of the tooth head than the tooth head edge-to-edge dimension of the second tooth 42a. FIGS. 12A and 12B show different faceting of the tooth face where the surface area of the central facet 43 (facet intersecting the tooth axis 27) in FIG. 12A is larger than the central facet in FIG. 12B. In addition, facets to the side of the central facet 43 have less surface area than the corresponding facets in FIG. 12B and are positioned at a steeper angle to the central facet (and the central axis 27) than in FIG. 12B.

Figure 7:
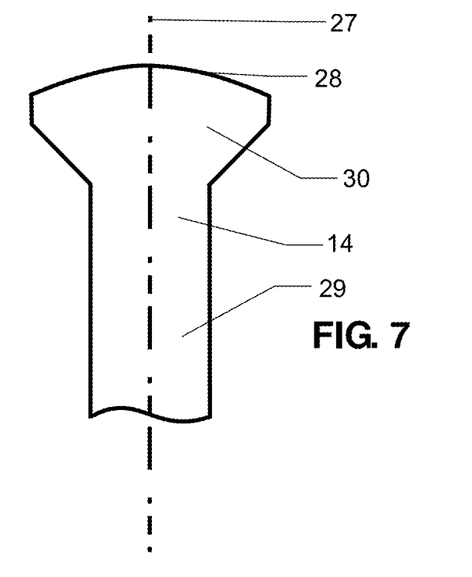
FIG. 7 shows an embodiment of a symmetric tooth for a stator.
Figure 8A:
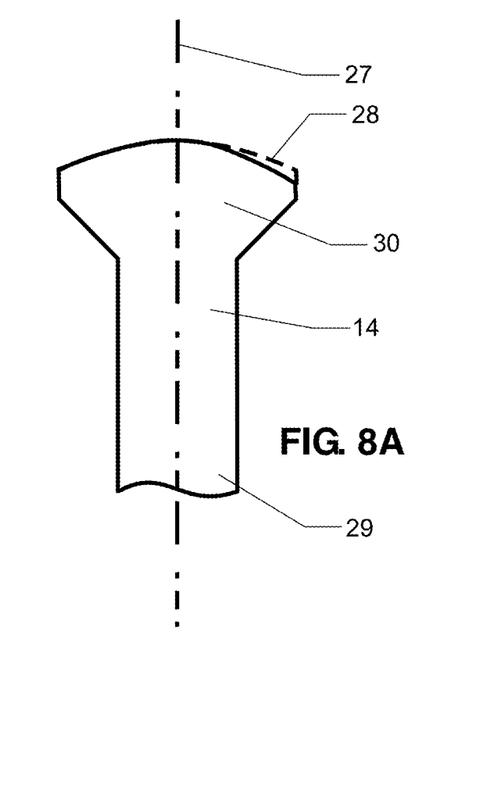
FIGS. 8A and 8B show embodiments of asymmetric teeth for a stator.
Figure 8B:
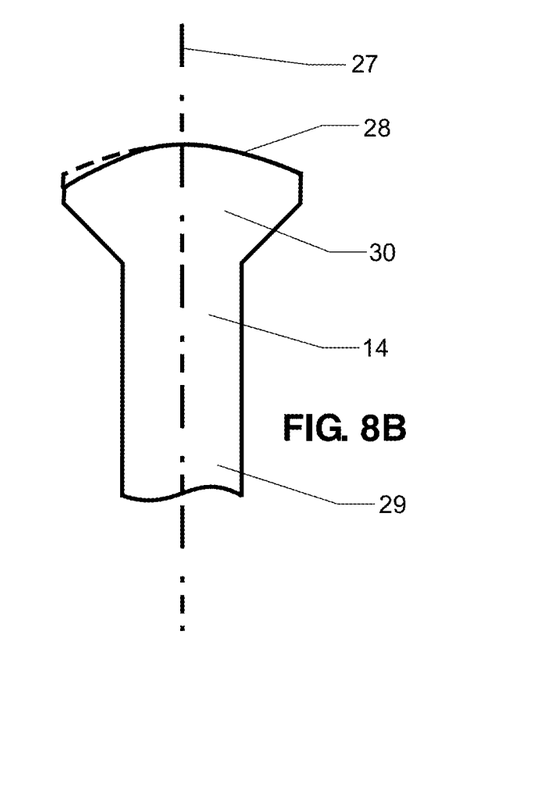

In various embodiments, the asymmetry of the tooth faces can include changing a radius of curvature for the tooth face on one side of the tooth axis 27 in comparison to the radius of curvature for the tooth face on the other side of the tooth axis, such as that shown in FIG. 8A, in contrast to the symmetric tooth of FIG. 7, or by otherwise increasing or decreasing the tooth gap 16 (the distance between the tooth and the rotor) on one side of the tooth axis as compared to the other side of the tooth axis. In some embodiments, the tooth face can be asymmetric due to a narrowing or broadening of the tooth head 30 on one side of the tooth axis as compared to the other side of the tooth axis. The first stator section 13a can then be paired with a second stator section 13b having a countering asymmetry to the asymmetry, such as that shown in FIG. 8B, to counter the asymmetry in the magnetic field of the coil/tooth of the first stator section. Any suitable method can be used to impart asymmetry to the shape of the tooth/coil of the first and second stator sections, such as those discussed above, with the particular asymmetries of the first and second stator layers selected and sized so as to result in at least partially countering the asymmetry or distortion of the magnetic field of each other, and at least partially reducing the torque ripple and/or cogging torque.

In some embodiments of a laminated stator 13 described herein, a first stator section 13a can be positioned in series with a second stator section 13b, where the two stator sections are placed end-to-end such that the centerline of the first stator section is coaxial with the second stator section and the teeth and winding openings of the first stator section correspond to the teeth and winding openings of the second stator section, respectively, to allow each coil to be made by winding conductor around one tooth of the first stator section and one tooth of the second stator section.

In some embodiments, a third stator layer can also be present, such as a stator layer lacking the asymmetry of the first and second layers, or a stator layer having asymmetry, such as that described for the first and second layers. In various embodiments, the third stator layer can be positioned between the first and second stator layers or can be positioned at one end or the other of the first and second stator layer assembly.

In some embodiments, the asymmetric first and second stator layers (and optional third stator layer) can be used with a rotor not having the asymmetric features described herein.

In a third approach to reduce torque ripple, asymmetric rotor layers and asymmetric stator layers can be combined with one another, such as a rotor having an asymmetric layer and a countering asymmetric layer or a layer without the asymmetric features described herein being combined with a stator having an asymmetric layer and a countering asymmetric layer (non-asymmetric layer) or a layer without the asymmetric features described herein (non-asymmetric stator layer).

In some embodiments, an asymmetric rotor layer can be countered by an asymmetric stator layer that is located adjacent to the asymmetric rotor layer or located adjacent to a different rotor layer. In some embodiments, an asymmetric rotor layer can be countered by an asymmetric stator layer and an asymmetric rotor layer, where the asymmetric stator layer is located adjacent to the asymmetric rotor layer or located adjacent to the countering asymmetric rotor layer. In some embodiments, an asymmetric stator layer can be countered by an asymmetric stator layer and an asymmetric rotor layer, where the asymmetric rotor layer is located adjacent to the asymmetric rotor layer or the countering asymmetric stator layer.

As used herein, the words "approximately", "about", "substantially", "near" and other similar words and phrasings are to be understood by a person of skill in the art as allowing for an amount of variation not substantially affecting the working of the device, example or embodiment. In those situations where further guidance is necessary, the degree of variation should be understood as being 5% or less.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims.

We claim:

1. A motor rotor comprising:
   a rotor comprising first and second rotor sections and a series of magnets,
   the first rotor section comprising:
      a series of magnet pockets proximate an outer edge of the first rotor section and configured to receive respective magnets to magnetically interact with a series of coils located in a stator and distributed around the first rotor section to effect relative rotation of the rotor and stator upon energization of the coils during operation;
      each of the magnets having a respective d-axis extending through the magnet and the outer edge of the first rotor section;

the first rotor section comprising for each magnet a respective air hole or air barrier that is asymmetric about a respective d-axis; wherein each air hole or air barrier results in an asymmetric magnetic field for the respective magnet;

the second rotor section comprising:
a series of magnet pockets proximate an outer edge of the second rotor section and configured to receive respective magnets to magnetically interact with a series of coils located in a stator and distributed around the second rotor section to effect relative rotation of the rotor and stator upon energization of the coils during operation;

each of the magnets having a respective d-axis extending through the magnet and the outer edge of the second rotor section;

the second rotor section comprising for each magnet a respective air hole or air barrier that is asymmetric about a respective d-axis; wherein each air hole or air barrier results in an asymmetric magnetic field for the respective magnet;

wherein the first rotor section is positioned in series with the second rotor section with the magnet pockets of the first rotor section corresponding to the magnet pockets of the second rotor section; and wherein each of the magnets is located within a magnet pocket of the first rotor section and a magnet pocket of the second rotor section;

wherein during operation, the asymmetry of the magnetic fields of the second rotor section causes a ripple in the torque that at least partially counters a ripple of the asymmetry of the magnetic fields of the first rotor section; and wherein the respective air hole or air barrier of the first rotor section is only located on one side of the respective d-axis, and the respective air hole or air barrier of the second rotor section is only located on an other side of the respective d-axis which is opposite to the one side of the respective d-axis with respect to the respective d-axis.

2. The motor rotor of claim 1, wherein the asymmetry of the magnetic field in the first and second rotor sections is caused by asymmetry in air holes only.

3. The motor rotor of claim 1, wherein the asymmetry of the magnetic field in the first and second rotor sections is caused by asymmetry in air barriers only.

4. A motor stator comprising:
a first stator section and a second stator section and a series of coils,
the first stator section comprising:
a series of winding openings, each winding opening configured to receive wire to form one of the series of coils wrapped around a tooth of the first stator section;
each tooth of the first stator section providing a first stator magnetic field;
the second stator section comprising:
a series of winding openings, each winding opening configured to receive wire to form one of the series of coils wrapped around a tooth of the second stator section;
each tooth of the second stator section providing a second stator magnetic field;
wherein the first stator section is positioned in series with the second stator section with the teeth of the first stator section corresponding to the teeth of the second stator section and the coil for each tooth is made by winding conductor around a tooth of the first stator section and the corresponding tooth of the second stator section, and during operation, the first stator magnetic field causes a first ripple in the torque that at least partially counters a second ripple in the torque caused by the second stator magnetic field; and wherein the each tooth of the first stator section has a shape asymmetric with respect to a respective tooth axis of the each tooth of the first stator section, and the each tooth of the second stator section has a shape asymmetric with respect to a respective tooth axis of the each tooth of the second stator section.

5. The motor stator of claim 4, wherein the tooth of the first stator comprises a first tooth head, and the first tooth head has a first tooth head shape, the tooth of the second stator section comprises a second tooth head, and the second tooth head has a second tooth head shape, the first and second tooth heads being different from one another, and a difference between the first and second torque ripples is related to a difference in the first and second tooth head shapes.

6. The motor stator of claim 5, wherein the first tooth head shape and the second tooth head shape differ in an edge-to-edge width.

7. The motor stator of claim 5, wherein the first tooth head has a face that comprises one or more facets and the second tooth had has a face that comprises one or more facets that correspond to the one or more facets of the first tooth head, and the first tooth head shape and the second tooth head shape differ in a surface area of a facet of the first tooth head and a corresponding facet of the second tooth head.

8. A motor comprising:
a rotor comprising first and second rotor sections and a series of magnets; and
a motor stator comprising first and second stator sections and a series of coils,
wherein,
the first rotor section comprising:
a series of magnet pockets proximate an outer edge of the first rotor section and configured to receive respective magnets to magnetically interact with a series of coils located in a stator and distributed around the first rotor section to effect relative rotation of the rotor and stator upon energization of the coils during operation;
each of the magnets having a respective d-axis extending through the magnet and the outer edge of the first rotor section;
the first rotor section comprising for each magnet a respective air hole or air barrier that is asymmetric about a respective d-axis; wherein each air hole or air barrier results in an asymmetric magnetic field for the respective magnet;
the second rotor section comprising:
a series of magnet pockets proximate an outer edge of the second rotor section and configured to receive respective magnets to magnetically interact with a series of coils located in a stator and distributed around the second rotor section to effect relative rotation of the rotor and stator upon energization of the coils during operation;
each of the magnets having a respective d-axis extending through the magnet and the outer edge of the second rotor section;
the second rotor section comprising for each magnet a respective air hole or air barrier that is asymmetric about a respective d-axis; wherein each air hole or air barrier results in an asymmetric magnetic field for the respective magnet;

wherein the first rotor section is positioned in series with the second rotor section with the magnet pockets of the first rotor section corresponding to the magnet pockets of the second rotor section; and wherein each of the magnets is located within a magnet pocket of the first rotor section and a magnet pocket of the second rotor section;

the first stator section comprising:
  a series of winding openings, each winding opening configured to receive wire to form one of the series of coils wrapped around a tooth of the first stator section;
  each tooth of the first stator section providing a first stator magnetic field;

the second stator section comprising:
  a series of winding openings, each winding opening configured to receive wire to form one of the series of coils wrapped around a tooth of the second stator section;
  each tooth of the second stator section providing a second stator magnetic field;
  wherein the first stator section is positioned in series with the second stator section with the teeth of the first stator section corresponding to the teeth of the second stator section and the coil for each tooth is made by winding conductor around a tooth of the first stator section and the corresponding tooth of the second stator section; and during operation, the first stator magnetic field causes a ripple in the torque that at least partially counters a ripple in the torque caused by the second stator magnetic field wherein the respective air hole or air barrier of the first rotor section is only located on one side of the respective d-axis, and the respective air hole or air barrier of the second rotor section is only located on an other side of the respective d-axis which is opposite to the one side of the respective d-axis with respect to the respective d-axis.

9. The motor stator of claim 8, wherein the tooth of the first stator comprises a first tooth head, and the first tooth head has a first tooth head shape, the tooth of the second stator section comprises a second tooth head, and the second tooth head has a second tooth head shape, the first and second tooth heads being different from one another, and a difference between the first and second torque ripples is related to a difference in the first and second tooth head shapes.

10. The motor stator of claim 9, wherein the first tooth head shape and the second tooth head shape differ in an edge-to-edge width.

11. The motor stator of claim 9, wherein the first tooth head has a face that comprises one or more facets and the second tooth had has a face that comprises one or more facets that correspond to the one or more facets of the first tooth head, and the first tooth head shape and the second tooth head shape differ in a surface area of a facet of the first tooth head and a corresponding facet of the second tooth head.

12. The motor rotor of claim 8, wherein the asymmetry of the magnetic field in the first and second rotor sections is caused by asymmetry in air holes only.

13. The motor rotor of claim 8, wherein the asymmetry of the magnetic field in the first and second rotor sections is caused by asymmetry in air barriers only.

* * * * *